Oct. 19, 1937.   H. C. MERRIAM   2,096,334
PROCESS FOR IMPROVING THE QUALITY OF ALCOHOLIC BEVERAGES
Filed April 29, 1935
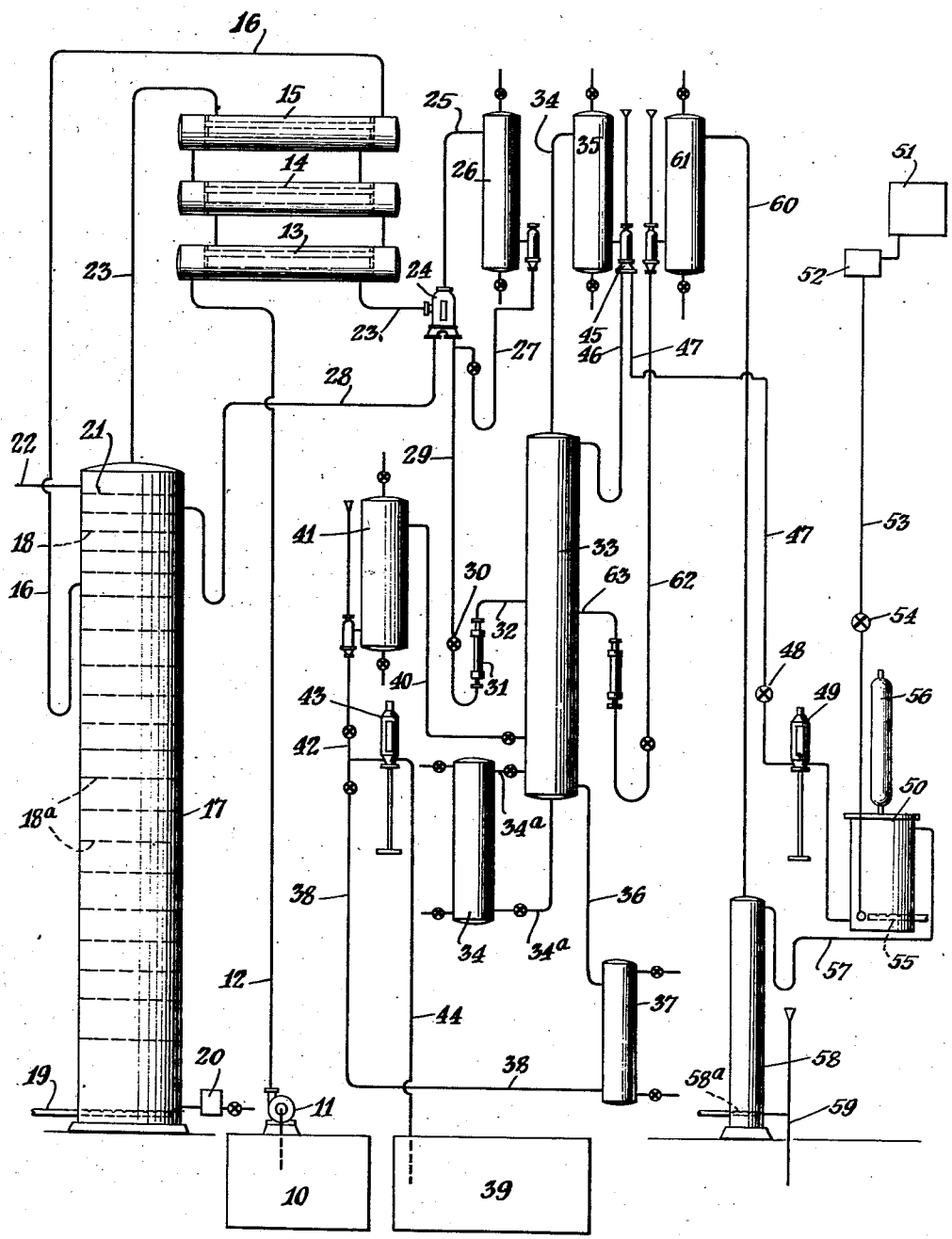
INVENTOR
Harry C. Merriam
BY
Moquet, Neary & Campbell
ATTORNEYS Patented Oct. 19, 1937

2,096,334

UNITED STATES PATENT OFFICE 2,096,334

PROCESS FOR IMPROVING THE QUALITY OF ALCOHOLIC BEVERAGES

Harry C. Merriam, Newton Highlands, Mass., assignor to E. B. Badger & Sons Co., Boston, Mass., a corporation of Massachusetts Application April 29, 1935, Serial No. 18,777

1 Claim. (Cl. 99—48)

My invention relates to a process for the treatment of alcoholic beverages such as whiskey, rum, brandy, etc., and more specifically to a process for converting the aldehydes and other undesirable substances, normally present in such beverages, into desirable esters thereby increasing the amount of the esters originally present in the beverage and thus improving its quality and minimizing the necessity for long ageing.

According to the usual method for producing whiskey and other similar alcoholic beverages, the wash from the fermenting vats is distilled in a continuous still, and the total of light boiling materials are vaporized and then condensed with the alcohol at a strength of less than 160 proof to form the raw whiskey. This total overhead distillate includes aldehydes and other objectionable substances which if allowed to remain will impair the quality of the beverage and if removed by the ordinary prior art fractionating methods will result in a substantial loss of the desirable alcohols present in the fraction since the latter are difficultly separable from the aldehydes by simple distillation.

In accordance with my invention I have discovered that if the overhead distillate supra, containing alcohol, aldehydes etc., is fractionated to effect further partial separation and a small heads fraction is then removed and treated with an acid solution of an oxidizing agent (e. g. sulphuric acid and potassium permanganate) capable of converting the aldehydes and the like into organic acids and non-volatile gums, the organic acids so formed will combine to some extent with the alcohols present to form the desirable esters. The thus treated heads fraction is then returned to the distillating system and blended with the other desirable distillates. By means of this process the presence of undesirable aldehydes in the final alcoholic product is avoided and the percentage of desired esters therein is materially increased so that the beverage in taste, flavor, and other such characteristics is similar to aged beverages.

One of the objects of my invention is to provide a continuous process for improving the quality of alcoholic beverages, in which a small quantity of aldehyde containing heads is continually removed from the distilling and fractionating system and treated in such a manner that when it is returned to the system it improves rather than detracts from the quality of the beverage.

The novel features of my invention are set forth with particularity in the appended claim. The method of operation of my invention, however, will be clearly understood from the following more specific description taken in conjunction with the accompanying drawing.

The drawing shows in diagrammatical form an elevation of one system for carrying out the process of my invention, although it will be apparent to one skilled in this art that my invention, as described more in detail hereinafter, is adaptable to various other types of distilling and fractionating systems including those capable of continuous, bath, or discontinuous operation.

Referring now to the drawing, the beer, that is, the liquid obtained from the fermenting vats 10, is passed, by means of pump 11, through line 12 into three heat exchangers 13, 14, and 15 in which the beer is preliminarily heated. From the heat exchanger 15 the beer passes through line 16 into the beer distilling column 17. This column 17 is provided with a number of rectifying plates 18, four of which are shown and exhausting plates 18a. The column 17 is provided with steam, which is introduced at the bottom of the column through the line 19. The slop or waste formed in this column passes out through the outlet 20.

In this column 17 the steam introduced at the bottom exhausts the alcohol from the slop and the alcoholic vapors pass from the exhausting section of the column upward through the rectifying section containing the rectifying plates 18. Above these rectifying plates is positioned a water washing plate 21 onto which water is usually added through line 22 for the purpose of improving the odor of the distillate.

The vapors from the top of the column 17 pass through the vapor line 23 and down through the heat exchangers 15, 14 and 13. By means of the transfer of heat from these hot vapors to the liquid beer flowing through these heat exchangers, as mentioned above, part of the vapors are condensed into liquid. The condensate and remaining vapors flow out through the line 23 into the separator 24, the vapors passing upward through line 25 into the condenser 26. This condenser is of the ordinary water-cooled type and the condensate formed therein passes downward through line 27 into the separator or sight box 24.

Some of the condensate in the sight box 24 is returned by way of line 28 to the rectifying plates 18 in the fractionating tower 17, and is there refluxed and the vapors therefrom carried through the cooling and condensing parts of the system described above. The remaining portion of the condensate in the sight box 24 passes through line 29 and control valve 30 to the weir box or measuring device 31, and thence through line 32 into the fractionating column 33.

The fractionating column 33 is heated at the base by means of an adjacent steam heater 34 connected thereto by lines 34a. As the liquid, introduced into the column 33 through the line 32, descends through the column 33, its light undesirable impurities are stripped out by means of the ascending vapors which concentrate finally in the upper part of the column 33, and pass out through vapor line 34b into the top of the condenser 35.

The liquid or condensate that forms in the column 33 and which has been stripped of its undesirable impurities as explained above is further treated in either one of two ways. It may be permitted to flow from the base of the column 33 through line 36 into the water-cooled cooler 37, and from thence passed through the line 38, regulator 43 and line 44 to the cistern 39. Alternatively, the condensate in the column 33 may be removed in vapor form by any conventional controllable means and passed through line 40 into the condenser 41. The condensate formed in the condenser 41 is then passed through line 42 and regulator 43 and discharged through line 44 into the cistern 39.

Referring now again to the fractionating column 33, the overhead or vapors which form therein and pass through line 34 into the condenser 35, as stated above, are condensed in 35 and the condensate passes into the regulating box 45. The major portion of the condensate in the regulator box 45 is passed back through line 46 into the top of the fractionating column 33 as reflux. The remainder of the condensate in the box 45, approximately 10%, is drawn off through line 47 and valve 48 into a regulator 49.

The condensate in the regulator 49 passes into a digester 50. In this digester 50 there is a controlled amount of a solution of potassium permanganate and sulphuric acid which was initially mixed in the chamber 51 and passed therefrom through the float tank 52, line 53, and valve 54 into the digester 50. Steam is admitted through the line 55 into the base of the digester 50 to maintain the mixture therein at approximately its boiling point, and the vapors so generated are condensed and refluxed by means of the reflux condenser 56.

In this digesting chamber 50 the potassium permanganate oxidizes the aldehydes contained in the heads fraction (passed into this chamber) into acetic acid and other organic acids and into comparatively non-volatile gums. The organic acids so formed in the presence of sulphuric acid react with the alcoholic portions of the heads fraction to form the desirable esters mentioned above. The digested material, including the thus formed esters and the remaining alcohol and also the waste products and treating agents continually pass out through the line 57 into the exhausting column 58.

Steam is admitted at the base of the exhausting column 58 through line 58a, stripping out the alcohol and esters and allowing the heavy polymers and other reaction products to flow out as waste through the outlet 59. The vaporous alcohol and esters pass upwardly through the line 60 and into the condenser 61. The condensate formed in this condenser flows back through line 62 and enters the fractionating column 33 at the point 63, which is just below the point at which the feed is introduced into the column through the line 32 as explained hereinbefore.

It is thus apparent from the above description that the heads fraction, as it is taken from the fractionating system, is in an impure and undesirable form but after treatment with the acid-permanganate solution it is converted into a desirable and beneficial form and as such is returned to the fractionating system to be blended with the other desirable portions of the distillate.

For the acid-permangate mixture I have found that satisfactory results can be obtained by using 2 lbs. of potassium permanganate and 35 lbs. of 66° Baumé sulphuric acid per 100 gallons of water. Of this mixture there is then used 10 gallons per hour for every 25 gallons per hour of heads fraction, passed into the treating chamber 50, from the whiskey, rum or other beverage being distilled. These proportions indicate my preferred treatment although the proportion of acid to permanganate per 100 gallons of water may range from 20 pounds of acid to 1 pound permanganate, to 50 pounds of acid to 5 pounds permanganate. I have found also that as low as 5 gallons of the treating solution to 25 gallons of heads fraction is effective. The upper limit is largely dependent upon the cost of the treating solution and the amount of the aldehydes present in the heads. However, as indicated above the usual run does not require more than 10 gallons of treating solution per hour for every 25 gallons of heads fraction although more may be used. Any suitable oxidizing agent may, of course, be substituted for the potassium permanganate and likewise any of the suitable acids, for example phosphoric acid, may be substituted for the sulphuric acid, supra.

It is to be understood that my invention is not limited to the specific apparatus, methods and materials described hereinabove by way of example but is susceptible to various modifications and changes, all of which come within the purview of the following claim.

What I claim is:

A process for artificially ageing whiskey, rum, brandy, and other distilled alcoholic spirits by converting the undesirable aldehydes normally present in the raw beverages into desirable esters comprising, fractionating the raw beverage, removing a portion of the heads from the fractionating zone while returning the remainder of the fractionated portions to said fractionating zone, digesting said removed heads fraction, which contains aldehydes and other impurities, with a heated sulphuric acid potassium permanganate solution to convert said aldehydes into esters, removing the digested mixture, separating by distillation the desirable alcohols and esters from the heavy polymers formed, and returning said desirable alcohols and esters to said fractionating zone, whereby the amount of desirable esters in the total fractionated products is substantially increased.

HARRY C. MERRIAM.

CERTIFICATE OF CORRECTION.

Patent No. 2,096,334.                                October 19, 1937.

HARRY C. MERRIAM.

It is hereby certified that error appears in the printed specification of the above numbered patent requiring correction as follows: Page 1, second column, line 11, for the word "bath" read batch; and that the said Letters Patent should be read with this correction therein that the same may conform to the record of the case in the Patent Office.

Signed and sealed this 16th day of November, A. D. 1937.

(Seal)

Henry Van Arsdale,
Acting Commissioner of Patents.